US010474662B2

(12) United States Patent
Prodam et al.

(10) Patent No.: US 10,474,662 B2
(45) Date of Patent: Nov. 12, 2019

(54) METHOD AND SYSTEM FOR DATABASE PROCESSING UNITS

(71) Applicant: UNICREDIT S.p.A., Rome (IT)

(72) Inventors: Riccardo Prodam, Milan (IT); Marcello Paris, Rome (IT); Fabio Ramponi, Varese (IT)

(73) Assignee: UNICREDIT S.p.A., Rome (IT)

( * ) Notice: Subject to any disclaimer, the term of this patent is extended or adjusted under 35 U.S.C. 154(b) by 391 days.

(21) Appl. No.: 15/321,683

(22) PCT Filed: Jun. 23, 2014

(86) PCT No.: PCT/IT2014/000167
§ 371 (c)(1),
(2) Date: Dec. 22, 2016

(87) PCT Pub. No.: WO2015/198356
PCT Pub. Date: Dec. 30, 2015

(65) Prior Publication Data
US 2017/0161267 A1 Jun. 8, 2017

(51) Int. Cl.
*G06F 16/23* (2019.01)
*G06F 16/22* (2019.01)
*G06F 9/50* (2006.01)

(52) U.S. Cl.
CPC .............. *G06F 16/23* (2019.01); *G06F 9/5044* (2013.01); *G06F 16/2237* (2019.01);
(Continued)

(58) Field of Classification Search
CPC ..................... G06F 16/23; G06F 16/2237
See application file for complete search history.

(56) References Cited

U.S. PATENT DOCUMENTS

2006/0269148 A1* 11/2006 Farber .................... G06Q 40/00
382/232
2008/0183688 A1 7/2008 Chamdani et al.
(Continued)

OTHER PUBLICATIONS

International Search Report for corresponding International Patent Application No. PCT/IT2014/000167 dated Mar. 17, 2015, 3 pgs.
(Continued)

*Primary Examiner* — Jensen Hu
(74) *Attorney, Agent, or Firm* — Merchant & Gould P.C.

(57) ABSTRACT

An electronic processor including a programmable processing device and a processor, optimizes processing of data structures by carrying out operations on coded data in the data structures. The programmable processing device autonomously carries out predetermined basic operations on data structures, so that each basic operation is managed as a pre-programmed primitive operation. The processor receives flow of coded data belonging to a data structure, and an operation request on the coded data; then, recognizing the data structure of the received data flow and the requested operation; then, determining whether to perform the requested operation or have the programmable processing device carry out the requested operation. If performed by the programmable processing device, the processor sends coded data and information about the recognized data structure and requested operation to the programmable processing device. The requested operation is executed autonomously on the received data flow and a result is obtained.

21 Claims, 1 Drawing Sheet

(52) U.S. Cl.
CPC ...... *G06F 16/2246* (2019.01); *G06F 16/2255* (2019.01); *G06F 16/2264* (2019.01); *G06F 16/2272* (2019.01)

(56) References Cited

U.S. PATENT DOCUMENTS

2015/0309937 A1* 10/2015 Yuan ................... G06F 12/0893
                                                                711/108
2017/0220610 A1*  8/2017 Laethem ............. G06F 11/3612

OTHER PUBLICATIONS

Arasu, A. et al., "A secure coprocessor for database applications", 2013 23rd International Conference on Field Programmable Logic and Applications, pp. 1-8, 2013.

Eguro, K. et al., "FPGAs for trusted cloud computing", 2012 22nd International Conference on Field Programmable Logic and Applications, pp. 63-70, 2012.

Shirazi, N. et al., "Quantitative Analysis of FPGA-Based Database Searching", Journal of VLSI Signal Processing Systems for Signal, Image, and Video Technology, 28(1/02): 85-96, 2001.

* cited by examiner

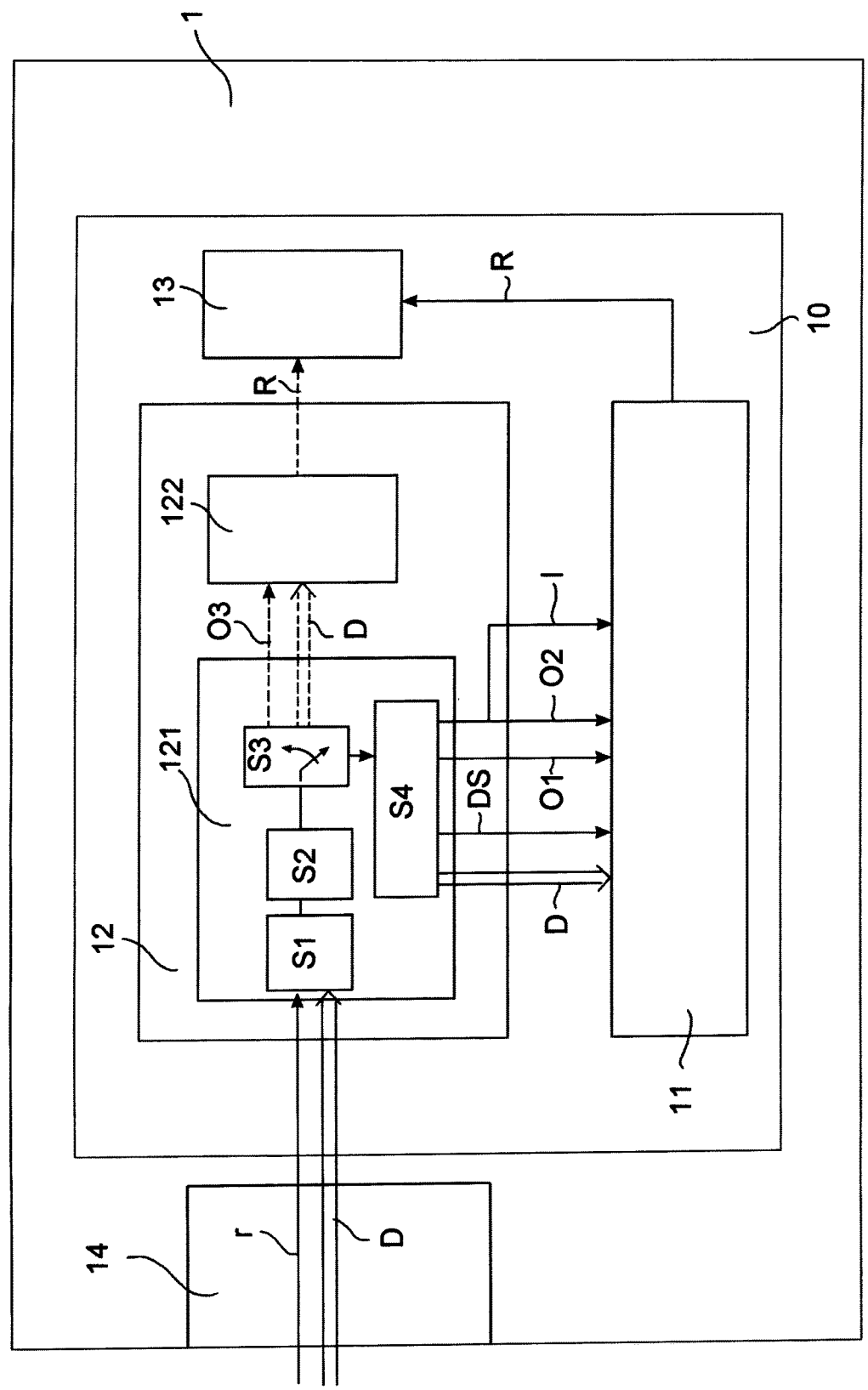

METHOD AND SYSTEM FOR DATABASE PROCESSING UNITS

This application is a National Stage Application of PCT/IT2014/000167, filed 23 Jun. 2014, and which application is incorporated herein by reference. To the extent appropriate, a claim of priority is made to the above disclosed application.

TECHNICAL BACKGROUND OF THE INVENTION

Field of Application

The present invention relates to the field of the management of data structures through electronic processing.

The invention relates to methods and systems for an improved processing of operations on data structures containing large amounts of data, and particularly methods and systems for processing unit for databases, in the context of databases having large size and complexity.

Description of the Prior Art

In the technical field of the management of databases, the execution of operations on structures of coded data is an essential aspect.

In fact, as it is well known, and as it is summarized herein in simplified terms, a set of physical level 0/1 bits is generally coded into bytes. Given a certain code, each byte, e.g., an 8-bit byte, takes a precise meaning: a character, or a meta-character, or an indicator of separation and/or punctuation, or an integer, or a decimal, and so on.

In turn, multiple bytes can form strings of bytes, which may represent "semantic" structures at a higher level, i.e., words, sentences, up to entire files of coded data.

Furthermore, strings of bytes, of any of the above-mentioned types, can be inserted into information fields, suitably stored, which in turn may be mutually linked by relationships and/or logic connections, for example forming the so-called "database records".

Thus, the structure set forth above defines an articulated "data structure", having multiple levels, incorporating a plurality of correlations between information fields, each of which contains strings of coded bytes, each of which is formed, at the lowest level, and closest to the physical level, by a plurality of bits.

Therefore, in the context of the database management, given a flow of bits, it is necessary to known the code with which they are coded, in order to identify the bytes, the strings of bytes, and their meaning; hence, it is necessary to known the type of data structure characterizing such data, in order to be able to determine how to operate thereon.

A number of data structures is known and is commonly used in databases, including, e.g., ordered lists, multi-dimensional tables, data arrays, graphs, and so on.

In the context of a "data structure", as defined above, there is the need to carry out "operations on data structures": by such a definition are commonly meant operations and/or functions relating to the management of the relationships among data. Usually, these operations are not arithmetic operations, nor, more generally, mathematic and/or numerical calculation operations. Instead, the operations on data structures more frequently relate to the order or the mutual correlation of data within the data structure: for example, the extraction or insertion of selected elements of a list or a table, the reordering according to the most various criteria of a list or of a table row or column, the reconfiguration of the connections between graph nodes, and so on.

Currently, there are, commercially available, a number of known systems that are capable of carrying out these operations and/or functions, which systems are in the form of, e.g., hardware-software platforms for managing databases.

Such known systems contemplate the use of hardware processing units of a standard type (for example, general-purpose CPUs, suitably provided with volatile and non-volatile memories), and they provide that the above-mentioned "operations on data structures" are generally performed by suitable specific software programs. Such software programs operate above the hardware physical level, and are further based on "lower level" software layers (such as, for example, an operating system supervising the operation of the machines in which the database is implemented): in such a sense, they can be defined as "high-level software programs". A number of "software packages" of such a type exists, for the database management; such "software packages" are loaded and executed by processing units, e.g., standard computers.

The versatility, simplicity, and cost-efficiency of such solutions, which employ standard hardware resources, have been and is often recognized as an advantage, in many possible applications; this explains the above-mentioned well-established trend towards a "software" implementation of the different operations to be carried out on data structures.

However, this type of known solutions also has some drawbacks.

In fact, to execute the requested operations on the data structures, the above-mentioned software programs implement corresponding algorithms, which perform the requested operations based on a plurality of basic steps executable by a general purpose processor. Therefore, each operation on a data structure is carried out by multiple basic/elementary steps and through multiple interaction steps with the processor and the memories thereof.

As the size of the databases to be managed increase, also the amount of hardware resources that is needed to perform the operations increases, approximately linearly, while keeping the response time constant. Vice versa, being the resources constant, the response time tends to linearly increase.

This involves a problem of scalability of the hardware resources, i.e., the need to significantly increase the number of resources to be provided, in terms of general purpose CPUs and memory resources, and therefore, in fact, in terms of the number of computers that are needed.

The above-mentioned drawbacks and problems, which could be considered as marginal in the field of small- or medium-sized databases, are becoming pressing and limiting in view of the current databases (for example, databases of administrative bodies, banks, press archives, and so on), the dimensions of which by now exceed the order of magnitude of the Terabytes, and which provide for more and more sophisticated and complex relationships among their records.

The near-future trend towards even larger and more complex databases make prospectively the currently available solutions less and less efficient and satisfactory.

Consequently, a significant need emerges for improving the way to manage very large-sized databases, in order to save resources, while keeping the performance constant, or to ensure a more satisfactory performance, while keeping the resources constant, or anyhow to find a better performance-resources trade-off, compared to the currently available solutions.

In fact, the above-mentioned currently available solutions do not allow meeting such a need to achieve an improvement in the management of very large-sized databases.

In this regard, it shall be noticed that also the possible use of mathematic co-processors, per se known in other technical fields relating to the electronic processing, would not solve the above-mentioned problems. In fact, the mathematic co-processors are capable of optimizing the execution of merely arithmetic and/or calculation operations, or of operations requiring intensive calculations; on the contrary, as already illustrated, the operations on data structures, at issue herein, are operations of a different type, i.e., operations that are not arithmetic, nor implementable by simple sequences of basic arithmetic calculations.

SUMMARY OF THE INVENTION

In view of the above, the object of the present invention is to devise and provide a method for processing operations on data structures, and a related system, that are improved so as to meet the above-mentioned needs as much as possible, and capable of at least partially obviating the drawbacks described herein above with reference to the prior art.

BRIEF DESCRIPTION OF THE DRAWING

Further characteristics and advantages of the method for optimized processing of operations on data structures, and the corresponding system capable of performing such a method, according to the invention, will be apparent from the description set forth below of preferred embodiment examples, given by way of illustrative, non-limiting example, with reference to the appended FIG. 1.

FIG. 1 illustrates a functional scheme of a system for optimized processing of operations on data structures, according to an embodiment of the present invention.

DETAILED DESCRIPTION

A method for optimized processing of data structures, by electronic processing means 10 comprising a programmable processing device 11 and at least one processor 12, by carrying out operations on coded data contained in the data structures, will be described in more detail with reference to FIG. 1.

Firstly, the method comprises the step of programming the programmable processing device 11, so that it is capable of carrying out autonomously a predetermined plurality of basic operations on one or more of the data structures at issue, so that each of such basic operations is managed as a pre-programmed primitive operation (i.e., "primitive").

Then, the method comprises the following steps, performed by the at least one processor 12: receiving in input (step S1) a flow of coded data D belonging to one of said data structures, and a request r of an operation to be carried out on such coded data D; then, recognizing (step S2) the data structure DS of the received data flow and the requested operation O; then, determining (step S3), based on the received data structure DS and the requested operation O, whether to carry out the requested operation O or to get the programmable processing device 11 to carry out the requested operation.

If the at least one processor determines, based, for example, on predetermined rules stored therein, that the requested operation O has to be performed by the programmable processing device 11, the method comprises the further steps of sending (step S4) to the programmable processing device 11, by the at least one processor 12, the flow of coded data D and a piece of information about the recognized data structure DS and about the requested operation O; then, carrying out the requested operation O on the received data flow D, by the programmable processing device 11, autonomously, based on the basic operations pre-programmed therein; finally, providing, by the programmable processing device 11, the obtained result R.

With reference to what has been set forth above, it shall be noticed that an illustration of a "data structure", comprising coded data, according to the present description, and in accordance with definitions commonly adopted in the pertaining technical field, has already been provided above in the prior art description section. For example, a "data structure" may provide for a plurality of relationships and/or logic connections between information fields of a database, each of which contains strings of coded bytes, having a specific meaning that is determined by the coding, and each of which is formed, in the layer closest to the physical level, by a plurality of bits. A number of data structures is known and is commonly used in the databases, comprising, for example, ordered lists, multi-dimensional tables, data arrays, graphs, and so on. Further details on the "data structures" considered in the present invention will be provided below in this description.

The "operations on data structures", as already noticed above in the prior art description section, are operations and/or functions relating to the management of the relationships among data. Usually, such operations are not arithmetic operations or mathematic calculation and/or numeric computational operations; instead, they more frequently relate to the order or mutual correlation of data within the data structure: for example, the extraction or insertion of selected elements of a list or a table, the re-ordering according the most varied criteria of a list or of a table row or column, the reconfiguration of the connections between graph nodes, and so on. Further details about the "operations on data structures" considered in the present invention will be provided below in this description.

By the term "basic operations" are meant operations that are performed autonomously by the programmable processing device 11, so that, by providing in input to such device a flow of data and an indication of a basic (i.e., elementary) operation, the programmable processing device 11 is capable of carrying out such operation and outputting a flow of data, processed according to the basic operation, directly and without interactions or intermediate steps involving the processor 12 or other processing units. In other terms, such operations can be described as "primitive operations" of the method of the present invention, i.e., basic operations which, on one hand, do not require simpler operations to be carried out and, on the other hand, are provided as basic steps to carry out more complex operations.

In accordance with an embodiment of the method, the above-mentioned steps of receiving (step S1), recognizing (step S2), determining (step S3), and sending (step S4) are carried out by a software abstraction module 121, storable in the electronic processing means 10 and executable by the at least one processor 12.

The abstraction module 121 can be implemented, for example, by a software layer executed in a standard-type operating system, which can be the operating system of the machine on which the database to be managed is implemented.

According to an implementation example, the abstraction module 121 comprises one or more specific software programs, devoted to carry out the above-mentioned recognizing (S2), determining (S3), and sending (S4) steps. In an implementation option, such specific software programs are implemented in a distributed manner as a "low level" software layer on the operating system being used.

In accordance with another implementation example, the abstraction module 121 is used by further software programs executable in the processing means 10 and generating a code intelligible by the abstraction module 121.

In all the implementation options described above, the abstraction module 121 performs the important tasks of assessing the incoming flow of data, identifying the type of data structure and the requested operation (which is propaedeutic for any subsequent processing operation), and especially deciding whether the requested operation has to be performed by the processor 12, based on known software methods, or it has to be assigned to the programmable processing device 12.

To this aim, according to an implementation option of the method, the above-mentioned recognizing step (step S2) comprises classifying the requested operation, after identifying it, as a basic operation O1, or as a non-basic operation to be assigned O2 to the programmable processing device 11, or as a non-basic operation not to be assigned O3 to the programmable processing device 11.

In the case that the requested operation is a basic operation O1 (i.e., one of the basic operations pre-programmed in the processing device), the determining step (step S3) comprises assigning the operation to the processing device 11. In fact, in such a case, the programmable processing device 11, by virtue of the manner in which it is pre-programmed, is capable of performing autonomously such an operation, in the most rapid and direct way as possible.

Therefore, the above-mentioned step of carrying out comprises carrying out the requested operation O1 on the received data flow D, by the programmable processing device 11, by executing the corresponding pre-programmed operation, preferably through a single processing step, to get a corresponding result R.

Finally, the step of providing the obtained result comprises providing the obtained result R either to a system memory 13, or directly to the processor 12, by the programmable processing device 11.

If the requested operation is not one of the basic operations, the method provides for two options: the abstraction module 121 may recognize that anyway the operation is such as to be suitably executable by the programmable processing device 11 (therefore, it can be referred to as a "non-basic operation to be assigned"), or recognize that the operation is so complex that it can be more advantageously performed by the processor, via software, according to per se known procedures. The decision, by the abstraction module 121, may occur based on predetermined criteria, which are stored in the same module. The criteria can be pre-predetermined based on considerations of rapidity and/or simplicity in carrying out the operation by the programmable processing device or the processor.

In the case that the requested operation is a non-basic operation to be assigned O2, the determining step (step S3) comprises assigning the operation to the processing device 11. Furthermore, in this case, the sending step (step S4) further comprises the step of itemizing the received request, by the abstraction module 121, into a plurality of coded instructions I that use said basic operations, and sending such plurality of coded instructions I to the programmable processing device 11. In this case, therefore, the abstraction module 121 performs the further function of a mediator between the operation request and the programmable processing module 11.

The next step of carrying out comprises carrying out the requested operation O2 on the received data flow D, by the programmable processing device 11, using once or multiple times one or more of the basic operations pre-programmed therein, according to the above-mentioned plurality of coded instructions I (prepared by the abstraction module 121).

Finally, the step of providing the obtained result comprises providing the obtained result R either to a system memory 13, or directly to the processor 12, by the programmable processing device 11.

In the case that the requested operation is a non-basic operation not to be assigned O3, the determining step (step S3) comprises assigning the operation to the standard execution module 122 of the processing means 10; the step of carrying out comprises carrying out the requested operation O3 on the received data flow D, by the standard execution module 122, according to standard modes; the step of providing the obtained result comprises providing the obtained result R to a system memory 13, or directly to the processor 12, by the standard execution module 122.

In the above-illustrated embodiment, the method of the invention is capable of safeguarding the possibility to perform the requested operations in a "traditional" manner, via software, where this is convenient. On the other hand, the method advantageously allows to carry out most of the operations to be performed in a quicker and more efficient manner by the programmable processing device 11: this option, in turn, allows performing both basic operations (preferably, through a single operative step) and non-basic operations. In the latter case, multiple operative steps are needed, by the programmable processing device 11, which may however be simpler compared to the traditional execution, since they are based on a different, more evolved set of primitive operations, i.e., a collection of basic operations pre-programmed in the device 11.

In accordance with another implementation option, the method provides for the further step of configuring the programmable processing device 11 so that it is capable of acting also as a data structure storing system, and it is arranged to interoperate with the above-mentioned collection of basic operations.

According to an embodiment, the programmable processing device 11 is a FPGA ("Field-Programmable Gate Array") device.

In accordance with an implementation option, the method of the invention can be implemented by a plurality of programmable processing devices 11 operating in parallel, in each of which an abstraction sub-module is further programmed, suitable to interoperate with the abstraction module 101, for the management of the plurality of programmable processing devices 11.

Further details in this regard will be illustrated in a following section of the present description, dealing with the system according to the invention.

Referring now to the data structures, it shall be noticed that, in an application example of the method, such data structures DS are data structures in which a flow of information bits is organized into bytes and strings of bytes.

According to an implementation option, such data structures DS comprise relationships that are defined between different bytes of the data structure.

In such a case, in an implementation option, the method comprises the further step of processing such bytes or strings of bytes in streaming.

It shall be noticed that the data structures on which the method of the present invention can operate may also be seen as "collections", i.e., containers of ordered or non-ordered data, having logic connections between data that are defined therein. Such "collections" preferably relate to the application context of database management, but they may relate to other application program contexts, in which the present method may be also employed.

In accordance with different implementation options of the method, each of the data structures DS, on which the method can operate, belongs to a set comprising the following: hashmap; B-Tree; list; concatenated list; double concatenated list; set; tree; graph; vector/array; stack; queue; bag; tuple; table; scored table; time-stamped table.

The above-mentioned list is illustrative and it is not limiting.

The method according to the present invention is capable of operating on any sub-sets, or on all the above-mentioned data structures, and it can be adapted to operate also on further data structures, which are not mentioned herein.

In particular, such data structures (DS) can be any sets of database data structures.

Referring now to the basic operations (or primitive operations), which can be programmed in the programmable processing module 11, it shall be noticed that, in different application examples of the method, each of such basic operations may belong to the following set.

For a data structure of the "hashmap" type, such basic operations are, for example: set, get, increase ("inc"), delete, scan.

For a data structure of the "B-Tree" type, such basic operations are, for example: insert, delete, scan.

For a data structure of the "list" type, such basic operations are, for example: append, insert, delete.

For a data structure of the "set" type, such basic operations are, for example: add, remove.

For a data structure of the "graph" type, such basic operations are, for example: addition of a node, addition of a link, removal of a node, removal of a link, implementation of a graph traversal.

For a data structure of the "array" type, such basic operations are, for example: update of the $n^{th}$ element.

For a data structure of the "stack" type, such basic operations are, for example: push, pop.

For a data structure of the "bag" type, such basic operations are, for example: append, remove.

For a data structure of the "table" type, such basic operations are, for example:

insert, update, select, delete.

The above-mentioned list is illustrative, and it is not limiting.

The method according to the present invention can be configured to perform any sub-sets, or all the above-mentioned operations as basic operations, and can be adapted to operate also on further basic operations, not mentioned herein.

Furthermore, as stated above, the programmable processing device 11 can be programmed also to perform, through multiple operative steps, non-basic operations, that will be mentioned herein below.

In accordance with an embodiment example, the programmable processing device 11 is further configured to perform procedures of allocation/deallocation of resources and/or procedures of consensus-based management.

According to another embodiment example, the programmable processing device 11 is further configured to perform operations used to calculate hashing functions, and/or encryption/decryption functions and/or zero-knowledge proofs functions.

In accordance with an implementation option, each of the above-mentioned operations, when required, is carried out on one or more input strings to the programmable processing device 11, by a series/sequence of logic operations performed autonomously within the same device, until generating the result by the same programmable processing device 11.

Still referring to FIG. 1, a system 1 for optimized processing data structures, encompassed in the present invention, will be now described.

Such a system 1 comprises data input means 14 and electronic processing means 10, which, in turn, comprise at least one programmable processing device 11 and at least one processor 12.

The data input means 14 are configured to receive a flow of coded input data D, belonging to a data structure, and to receive a request r of operation on such coded data D.

The at least one programmable processing device 11 is configured to carry out autonomously a predetermined plurality of basic operations on the data structure of the coded data D, so that each of such basic operations is managed by the programmable processing device 11 as a pre-programmed primitive operation.

The at least one processor 12 is operatively connected to the data input means 12 to receive the above-mentioned flow of coded data D and the above-mentioned request r of operation, and it is configured to recognize the received data structure DS and the requested operation O and to determine, based on the recognized data structure DS and the requested operation O, whether to perform the requested operation or to get the programmable processing device 11 to carry out the requested operation.

The at least one processor 12 is further configured to send to the programmable processing device 11 the flow of coded data D and a piece of information about the recognized data structure DS and the requested operation O, if it has been determined to assign the execution of the requested operation O to the programmable processing device 11.

The programmable processing device 11 is operatively connected with the at least one processor 12, to receive the flow of coded data D and the piece of information about the data structure DS and the operation O, and it is configured to carry out the requested operation O on the received data flow D, and to provide the obtained result R.

According to an implementation option of the system 1, a software abstraction module 121 is stored in the processing means 10, which is executable by the at least one processor 12 to carry out the recognition of the received data structure DS and of the requested operation O, and to decide whether to assign or not the requested operation O to the programmable processing device 11. In this case, the software abstraction module 121 is further configured to send to the programmable processing device 11 the flow of coded data D and a piece of information on the recognized data structure DS and the requested operation O, if it has been determined to assign the execution of the operation O to the programmable processing device 11.

In accordance with an implementation option, the at least one processor 12 is configured to assign to the programmable processing device 11 a request of one of the basic operations O1, and the programmable processing device 11 is configured to carry out the requested operation by executing the corresponding pre-programmed operation through a single processing step.

According to a further implementation option, the at least one processor 12 is further configured to assign to the programmable processing device 11 a plurality of further non-basic operations O2. The at least one processor 12 is further configured, in the case of receiving a request for one of such further non-basic operations O2, to itemize such request into a plurality of coded instructions I that use the basic operations, and to send such coded instructions I to the programmable processing device 11. In such a case, the programmable processing device 11 is further configured to carry out the requested operation according to the coded instructions received from the at least one processor 12, using once or multiple times one or more of the basic operations pre-programmed therein.

In accordance with a particular implementation example, the system 1 further comprises a system memory 13, and the processing means 10 further comprise a standard execution module 122, configured to receive the flow of coded data D and the request of operation O, and to carry out such operation according to standard modes, in the case that the operation O3 is not a basic operation nor one of the further operations to be assigned to the programmed processing device 11. The results R obtained by the programmable processing module 11 or by the standard execution module 122, according to the cases, can be stored in the system memory 13 or provided directly to the at least one processor 12.

According to an embodiment of the system, the programmable processing device 11 is implemented by a FPGA ("Field-Programmable Gate Array") device, of a per se known type.

In fact, the FPGA devices can be implemented in per se known manners, as programmable integrated circuits, provided with programmable logic ports. As it is known, they may comprise, e.g., programmable gate arrays.

Furthermore, the FPGA devices may provide for any plurality of input terminals, which can be used in series or parallel, in the most various known modes, and of output terminals. In particular, according to an implementation example, each of the programmable processing devices 11 comprises a first plurality of input terminals, suitable to receive, in a parallel and/or series mode, the bits of the bytes of the incoming data flow, a second plurality of input terminals, suitable to receive control information and/or commands and/or instructions from the at least one processing module, and a plurality of output terminals.

According to an implementation example, the programmable processing device 11 comprises a plurality of programmable logic ports and a processing device memory.

In accordance with an implementation option, the programmable processing device 11 further comprises a plurality of memory cells, and/or a plurality of buffering cells, and/or a plurality of counters, and/or a plurality of other logic circuits.

According to an embodiment of the system, the programmable processing device 11 contains a high number of programmable logic ports, partitioned into different processing sets, each of which being programmed to carry out one basic operation, by programming the logic ports of the set. The programmable processing device 11 further comprises a set of logic ports that are programmed to select the processing set corresponding to the requested basic operation.

By virtue of the combinations of the functions of the logic ports of the processing sets and arrays of memory/buffering cells and counters, the FPGA device is capable of performing the above-mentioned basic operations.

For example, the FPGA device 11 can store a byte extracted from a flow of input bytes, or provided as an independent input, and append it to a list; or, the FPGA device 11 can count a series of bytes of an entering flow, to identify a position within the list, or in a row or a column of a table, and then proceed to the elimination of a byte occupying a certain position, or to replace it with a stored byte; furthermore, the FPGA device 11 can be configured to compare the input bytes with predefined bytes, to recognize a string, or to recognize and operate on meta-characters, e.g., representative of the connections on a graph, or of the connections between items of a table; and so on.

Those skilled in the art, based on the information given above, will be able to identify further possibilities to perform operations such as basic operations, by following the teachings of the present specification, and by applying per se known FPGA programming criteria.

According to an embodiment, the system 1 comprises a plurality of programmable processing devices 11 operating in parallel, in each of which an abstraction sub-module is further programmed, suitable to interoperate with the abstraction module 121.

In accordance with an implementation option, each of the at least one processor 12 is a general purpose Central Processing Unit (CPU), per se known.

According to an implementation example, the system 1 further comprises a data connection bus, configured to mutually operatively connect each of the above-mentioned one or more processors 12 and each of the above-mentioned one or more programmable processing devices 11.

From the viewpoint of the hardware architecture, the system 1 can be implemented according to per se known hardware architectures, for example, comprising one or more CPUs and one or more FPGAs, mutually connected by one or more data buses. The data communication, within the system 1, can be performed through the implementation of per se known data communication protocols.

From the viewpoint of the software architecture, the system 1 can be implemented according to per se known software architectures, for example, comprising a per se known standard operating system, realized through a plurality of software programs, and executable by the CPU, and further comprising, as a peculiar feature of the invention, the above-mentioned abstraction module 121, operating in the context of the operating system, and capable of carrying out the functions illustrated above.

According to different implementation examples, the system 1 is configured to carry out a method according to any of the above-illustrated embodiments of the method.

As it can be noticed, the object of the present invention is achieved by the method and the system described above.

In fact, based on what has been stated above, it shall be apparent that the method according to the invention is capable of carrying out in an efficient and quick manner a plurality of operations on data structures, by virtue of its own characteristics.

In particular, from the above description, the advantages of using a programmable processing device, programmed for carrying out a plurality of operations on coded data, i.e., functions operating on a data structure, such as basic operations, are apparent.

In fact, each of such basic operations is performed directly, and through a single operative step, by the present method, while in the prior art solutions, in the absence of the programmable processing device, the same operations have to be carried out through a plurality of sequential elementary steps.

Even for a number of further non-basic operations, the present method allows an execution that, while not being performed through a single operative step, can advantageously be quicker compared to corresponding executions in the prior art solutions, just because they are performed based on an extended and improved set of basic operations.

In other terms, the present method provides for bringing to a hardware level a wider and more extended set of logic operations (not necessarily mathematical operations, actually, generally non-mathematical operations, relating to a database and/or to data management) and using these logic operations, which are carried out in an optimized manner, as basic operative steps to implement all the desired functions, in a more rapid and efficient manner compared to what the known solutions allowed.

In view of the above, the method according to the invention allows processing in a more rapid and efficient manner a plurality of operations on data structures, hence performing a higher number of operations per time unit, while keeping the number of processors constant. Consequently, such a method is particularly suitable to manage very large and complex databases, in which the number of operations on data structures, that may be required, is very high.

Similar considerations apply for the system according to the invention described above. In particular, with reference to such a system, the invention provides for a programmable processing device which indeed acts as a specialized auxiliary processor, coexisting with and assisting general-purpose processors, by cooperating with them in an optimal manner. This also allows an advantageous scalability of the system, in view of the more and more stringent requirements given, for example, by the increase in the size and complexity of the databases to be handled.

Furthermore, the system of the invention allows a convenient adaptation to different applications, and an advantageous versatility, which can be obtained by specific programming of the programmable processing device, intended to define, according to the needs, any set of primitive operations, as provided for by the invention.

To the embodiments of the method and the system for processing data structures, according to the invention, described above, those of ordinary skill in the art, in order to meet contingent needs, will be able to make modifications, adaptations, and replacements of elements with functionally equivalent other ones, also together with the prior art, also creating hybrid implementations, without departing from the scope of the following claims. Each of the characteristics described as belonging to a possible embodiment can be implemented independently from the other embodiments described.

It shall be further noticed that the term "comprising" does not exclude other elements or steps, the term "a/an" or "one" does not exclude a plurality. Furthermore, the figures are not necessarily in scale; on the contrary, importance is generally given to illustrate the principles of the present invention.

The invention claimed is:

1. A method for optimized processing of data structures, by electronic processing means comprising a programmable processing device and at least one processor, by carrying out operations on coded data contained in the data structures, the method comprising the steps of:
   programming the programmable processing device to carry out autonomously a predetermined plurality of basic operations on said data structures, so that each of said basic operations is managed as a pre-programmed primitive operation;
   receiving in input, by the at least one processor, a flow of coded data belonging to one of said data structures, and a request of an operation on said coded data;
   recognizing, by the at least one processor, the data structure of the received data flow and the requested operation;
   determining, by the at least one processor, based on the received data structure and the requested operation, whether to carry out the requested operation or to get the programmable processing device to carry out the requested operation;
   wherein, if a determination has been made to have the programmable processing device carry out the requested operation, the method comprises the further steps of:
   sending to the programmable processing device the flow of coded data and information about the recognized data structure and the requested operation, by the at least one processor;
   carrying out the requested operation on the received data flow, by the programmable processing device, autonomously, based on said pre-programmed basic operations;
   providing, by the programmable processing device an obtained result;
   wherein the recognizing step comprises classifying the requested operation as a:
   basic operation;
   non-basic operation to be assigned to the programmable processing device;
   non-basic operation not to be assigned to the programmable processing device.

2. The method according to claim 1, wherein said receiving, recognizing, determining, and sending steps are carried out by a software abstraction module, storable in the electronic processing means and executable by the at least one processor.

3. The method according to claim 1, wherein:
   when the requested operation is a basic operation
      the step of determining comprises assigning the operation to the programmable processing device;
      the step of carrying out comprises carrying out the requested operation on the received data flow, by the programmable processing device, by executing the corresponding pre-programmed operation through a single processing step;
      the step of providing the obtained result comprises providing the obtained result to a system memory, by the programmable processing device;
   when the requested operation is a non-basic operation to be assigned:
      the step of determining comprises assigning the operation to the programmable processing device;
      the step of sending further comprises itemizing the received request, by the abstraction module, into a plurality of coded instructions that use said basic operations, and sending said plurality of coded instructions to the programmable processing device;
      the step of carrying out comprises carrying out the requested operation on the received data flow, by the programmable processing device, according to said plurality of coded instructions, using one or more of the basic operations pre-programmed therein;
      the step of providing the obtained result comprises providing the obtained result to a system memory, by the programmable processing device;

when the requested operation is a non-basic operation not to be assigned:
the step of determining comprises assigning the operation to a standard execution module of the processing means;
the step of carrying out comprises carrying out the requested operation on the received data flow, by the standard execution module, according to standard modes;
the step of providing the obtained result comprises providing the obtained result to a system memory, by the standard execution module.

4. The method according to claim 1, comprising the further step of configuring the programmable processing device so that the programmable processing device is capable of acting as a data structure storing system, and the programmable processing device is arranged to interoperate with the collection of said basic operations pre-programmed therein.

5. The method according to claim 2, wherein the abstraction module is implemented by a software layer executed in a standard-type operating system,
and
wherein said steps of recognizing, determining and sending are carried out by one or more further software programs, comprised in the abstraction module, and implemented in a distributed manner as a low level software layer on the operating system being used.

6. The method according to claim 5, wherein the abstraction module is used by further software programs executable in the processing means and generating a code intelligible by the abstraction module.

7. The method according to claim 1, wherein said data structures are data structures in which the flow of information bits is organized into bytes and strings of bytes,
and wherein the method comprises the further step of processing said bytes or strings of bytes in streaming.

8. The method according to claim 7, wherein said data structures comprise relationships defined between different bytes of the data structure.

9. The method according to claim 7, wherein each of said data structures belongs to a set comprising:
hashmap, B-Tree, list, concatenated list, double concatenated list, set, tree, graph, vector/array, stack, queue, bag, tuple, table, scored table, time-stamped table.

10. The method according to claim 1, wherein each of said basic operations belongs to a set comprising:
for a data structure of the "hashmap" type: set, get, increase ("inc"), delete, scan;
for a structure of the "B-Tree" type: insert, delete, scan;
for a data structure of the "list" type: append, insert, delete;
for a data structure of the "set" type: add, remove;
for a data structure of the "graph" type: addition of a node, addition of a link, removal of a node, removal of a link, implementation of a graph traversal;
for a data structure of the "array" type: update of the $n^{th}$ element;
for a data structure of the "stack" type: push, pop;
for a data structure of the "bag" type: append, remove;
for a data structure of the table type: insert, update, select, delete.

11. The method according to claim 10, wherein the programmable processing device is further configured to perform procedures of allocation/deallocation of resources and/or procedures of consensus-based management or
wherein the programmable processing device is further configured to perform operations used to calculate hashing functions, and/or encryption/decryption functions, and/or zero-knowledge proofs functions.

12. The method according to claim 11, wherein said non-basic operations to be assigned comprise said procedures of allocation/deallocation of resources and/or procedures of consensus-based management, or said operations used for hashing, and/or encryption and/or zero-knowledge proofs.

13. The method according to claim 10, wherein each of said operations is carried out on one or more input strings to the programmable processing device, by a series of logic operations performed autonomously within the programmable processing device, until generating the result by the programmable processing device, wherein the operations are primitives of the processing means.

14. A system for optimized processing of data structures, comprising:
data input configured to receive a flow of coded input data belonging to a data structure, and to receive a request of operation on said coded data;
electronic processing means, comprising:
at least one programmable processing device, configured to carry out autonomously a predetermined plurality of basic operations on said data structures, so that each of the basic operations is managed by the programmable processing device as a pre-programmed primitive operation;
at least one processor, operatively connected to the data input to receive said flow of coded data and said request of operation, and configured to recognize the received data structure and the requested operation and to determine, based on the recognized data structure and the requested operation, whether to carry out the requested operation or to have the programmable processing device carry out the requested operation;
wherein the at least one processor is further configured to send to the programmable processing device the flow of coded data and information about the recognized data structure and the requested operation, if a determination is made to assign the execution of the requested operation to the programmable processing device;
and wherein the programmable processing device is operatively connected to the at least one processor, to receive said flow of coded data and said information about the data structure and the operation, and the programmable processing device is configured to carry out the requested operation on the received data flow, and to provide an obtained result
wherein the at least one processor is configured to recognize the data structure by classification of the requested operation as a:
basic operation;
non-basic operation to be assigned to the programmable processing device;
non-basic operation not to be assigned to the programmable processing device.

15. The system according to claim 14, wherein a software abstraction module is stored in the processing means, said software abstraction module being executable by the at least one processor to carry out the recognition of the received data structure and of the requested operation and to decide whether to assign or not the requested operation to the programmable processing device, the software abstraction module being further configured to send to the programmable processing device the flow of coded data and information about the recognized data structure and the requested operation, in the case that a determination has been made to assign to the programmable processing device the execution of the operation.

16. The system according to claim 14, wherein the at least one processor is configured to assign to the programmable processing device a request of one of said basic operations, and the programmable processing device is configured to carry out the requested operation by executing the corresponding pre-programmed operation through a single processing step.

17. The system according to claim 14, wherein:
the at least one processor is further configured to assign to the programmable processing device a plurality of further non-basic operations, and the at least one processor is further configured, in the case of receiving a request of one of said further non-requested operations, to itemize said request into a plurality of coded instructions that use the requested operations, and to send said coded instructions to the programmable processing device;
the programmable processing device is further configured to carry out the requested operation according to the coded instructions received from the at least one processor, using one or more of the requested operations pre-programmed therein.

18. The system according to claim 14, further comprising a system memory, and wherein the processing means further comprise a standard execution module, configured to receive the flow of coded data and the request of operation, and to perform said operation according to standard modes, in the case that said operation is not a basic operation nor one of the further operations to be assigned to the processing device programmed.

19. The system according to claim 14, wherein the programmable processing device is implemented by a FPGA ("Field-Programmable Gate Array") device.

20. The system according to claim 14, comprising a plurality of programmable processing devices operating in parallel, in each of which an abstraction sub-module is further programmed, suitable to interoperate with said abstraction module.

21. The system according to claim 14, wherein each of the programmable processing devices comprises a first plurality of input terminals, suitable to receive, in a parallel and/or series mode, bits of bytes of the input data flow, a second plurality of input terminals, suitable to receive control information and/or commands and/or instructions from the at least one processing module, and a plurality of output terminals,
the programmable processing device comprises a plurality of programmable logic ports and a processing device memory
each of the at least one processor is a general-purpose Central Processing Unit (CPU)
wherein the system further comprises
a data connection bus configured to mutually operatively connect each of said one or more processors and each of said one or more programmable processing devices.

* * * * *